US008010955B2

(12) United States Patent
Presler-Marshall et al.

(10) Patent No.: US 8,010,955 B2
(45) Date of Patent: Aug. 30, 2011

(54) REDUCING THE RUN-TIME COST OF INCORPORATING CUSTOM TAGS IN A SERVER PAGE

(75) Inventors: Martin J. Presler-Marshall, Chapel Hill, NC (US); Scott H. Snyder, Chapel Hill, NC (US)

(73) Assignee: International Business Machines Corporation, Armonk, NY (US)

( * ) Notice: Subject to any disclaimer, the term of this patent is extended or adjusted under 35 U.S.C. 154(b) by 2343 days.

(21) Appl. No.: 10/794,940

(22) Filed: Mar. 5, 2004

(65) Prior Publication Data

US 2005/0198577 A1 Sep. 8, 2005

(51) Int. Cl.
*G06F 9/45* (2006.01)
(52) U.S. Cl. ......................................... 717/151; 717/137
(58) Field of Classification Search .................... 717/151
See application file for complete search history.

(56) References Cited

U.S. PATENT DOCUMENTS

| | | | |
|---|---|---|---|
| 5,542,070 A * | 7/1996 | LeBlanc et al. ................. | 703/20 |
| 5,905,895 A * | 5/1999 | Halter ............................ | 717/139 |
| 6,305,012 B1 | 10/2001 | Beadle et al. | |
| 6,981,212 B1 * | 12/2005 | Claussen et al. .............. | 715/513 |
| 7,000,185 B1 * | 2/2006 | Murren et al. ................. | 715/536 |
| 7,089,330 B1 * | 8/2006 | Mason .......................... | 709/246 |
| 2002/0083097 A1 | 6/2002 | Warrington | |
| 2002/0129331 A1 | 9/2002 | Zhang et al. | |
| 2003/0005411 A1 * | 1/2003 | Gerken ......................... | 717/120 |
| 2003/0014442 A1 | 1/2003 | Shiigi et al. | |
| 2003/0020752 A1 * | 1/2003 | Santiago ....................... | 345/764 |
| 2003/0078949 A1 * | 4/2003 | Scholz et al. ................. | 707/505 |
| 2003/0084120 A1 | 5/2003 | Egli | |
| 2003/0110446 A1 | 6/2003 | Nemer | |
| 2004/0040012 A1 * | 2/2004 | Barsness et al. .............. | 717/123 |
| 2004/0167960 A1 * | 8/2004 | Kinner et al. ................. | 709/203 |

OTHER PUBLICATIONS

Rockwell, "JSP Custom Tags" Sep. 14, 2001, QUE, accessed and printed online on Mar. 30, 2007 at <http://www.quepublishing.com/articles/printerfriendly.asp?p=23344&r1=1>.*
"Compile JSPs at build time?" Aug. 5, 2003, accessed and printed online on Mar. 30, 2007 at <http://listarchive.cinjug.org/html/users/2003-08/msg00009.html>.*
Mahmoud, Qusay H., *Developing 'Web Applications With JavaServer'Pages 2.0*, Sun Microsytems, Jul. 2003, Copyright © Sun Microsystems, Inc., http://java.sun.com/jsp_utils/PrintPage.jsp?url=http%3A%2 F%2Fjava.sun.com (visited Jan. 7, 2004).

(Continued)

*Primary Examiner* — James D Rutten
(74) *Attorney, Agent, or Firm* — Steven M. Greenberg, Esq.; Carey, Rodriguez, Greenberg & Paul

(57) ABSTRACT

The present invention is a method, system and apparatus for modifying a server page to reduce the cost of incorporating a custom tag in the server page. Specifically, the method can include the step of modifying program code translated from a server page to replace at least one method defined in the program code and corresponding to a custom tag with an optimized method defined for the custom tag. The modifying step further can include the step of modifying the program code prior to compiling the program code into a directly callable program object. Alternatively, the modifying step further can include the step of modifying the program code by modifying byte code produced by compiling the program code.

15 Claims, 3 Drawing Sheets

OTHER PUBLICATIONS

Author Unknown, *JavaServer Pages [tm] Technology—JavaServer Pages White Paper*, Copyright © Sun Microsystems, Inc. http://java.sun.com/products/jsp/jspguide-wp.html (visited Jan. 7, 2004).

Author Unknown, *JavaServer Pages [tm]Technology—White Paper*, Copyright © Sun Microsystems, Inc., http://java.sun.com/products/jsp/whitepaper.html (visited Jan. 7, 2004).

Author Unknown, *JavaServer Pages [tm] Technology—Powering the Web Experience with Dynamic Content*, Copyright © Sun Microsystems, Inc. http://java.sun.som/products/jsp/jsp_server.html (visited Jan. 7, 2004).

Pawlan, Monica, *Java 2 Enterprise Edition Technology Center*, Copyright © Sun, Microsystems, Inc., http://java.sun.com/developer/technicalArticles/J2EE/Intro/ (visited Jan. 7, 2004).

Gerry, David, *JSP Templates*, Nov. 2000 JavaWorld Magazine, Copyright 1994-2004Sun Microsystems, Inc. <http://java.sun.com/developer/technicalArticles/javaserverpages/jsp_templates/ (visited Jan. 7, 2004).

* cited by examiner

REDUCING THE RUN-TIME COST OF INCORPORATING CUSTOM TAGS IN A SERVER PAGE

BACKGROUND OF THE INVENTION

1. Statement of the Technical Field

The present invention relates to the deployment of a server page in a multi-tier distributed application environment and more particularly to the modification of a server page to reduce the cost of incorporating custom tags in the server page.

2. Description of the Related Art

Traditional client server application mix presentation and business logic in the client tier while the server tier provides backend data storage and server side business logic. Consequently, client server applications typically cannot scale within the enterprise given the difficulty in maintaining both the client tier and the server tier. Specifically, changes to the presentation layer of an application require the modification of the client side application which can impact the integrity of the business logic within the client tier. Similarly, changes to the business logic of the client can jeopardize the integrity of the presentation code in the client tier. Developing for the client tier also can be problematic where logic developers further develop the presentation layer, or where human factors designers develop for the logic layer of the application in the client tier.

To force a separation of the presentation and logic layers as is preferred among contemporary computer scientists, server page technologies have become the preferred vehicle for multi-tier application. Server page technologies release the client tier from the responsibility of processing logic for rendering the presentation layer. Moreover, server pages largely separate presentation layer logic from the static elements of the presentation layer so that user interface designers can perform changes to the static elements of the presentation layer without breaching the integrity of the programmatic elements of the presentation layer.

Typical server page technologies permit a mixing of statically defined user interface elements and programmatic scripts in a single document. The programmatic scripts can be processed server-side to produce a translated presentation layer document. The translated presentation layer document can be delivered to the client side where the translated presentation layer document can be rendered to a user interface. Notably, in addition to embedded programmatic scripts, the server page further can include macro references to externally defined programmatic logic. In this way, the complexity of the programmatic logic can be hidden from the view of the user interface designer charged with the development and maintenance of the server page.

Java Server Page™ (JSP) and the active server page (ASP) represent two popular server page technologies which have been deployed widely in recent years. JSPs, in particular, are a well-known and accepted method of displaying content in a Web application. JSPs combine the ease of use of a markup language document for the Web developer with power and flexibility of a scripting language for the applications developer. Consequently, at present JSPs are the preferred way to display information produced by the business logic of an application deployed within an application server, such as the WebSphere® application server manufactured by the International Business Machines Corporation of Armonk, N.Y., United States of America.

Notably, the ease of use of the JSP stems from the fact that a JSP typically consists mostly of markup, which can be created and managed by a Web developer using familiar development tools. The power of the JSP, on the other hand, stems from the fact that a JSP can contain arbitrary Java code. Advantageously, the jointly formed document can be compiled and the resulting compilation can be executed by a JSP aware Web application server such as the WebSphere™ application server manufactured by IBM Corporation of Armonk, N.Y.

Server pages which include significant amounts of both markup and code can become quite difficult to maintain. In this regard, server pages can be difficult to read and maintaining a server page can require the skills of both a programmer and a page designer. To remedy the difficulty of maintaining server pages, custom tag libraries have been developed to offload substantially complex logic from the server page. In particular, much like a macro, custom tags can encapsulate logic within a server page without directly requiring the embedding of code in the server page. At compile time, the custom tags can be processed by the server page compiler.

In operation, for each use of a custom tag, the server page compiler can create an instance of a class which implements the custom tag. Once instantiated, several attributes can be set in relation to the instance. Finally, lifecycle methods included in the compiled rendition of the server page can be called in relation to the instance. While the lifecycle methods included in the instantiation can vary by server page reference implementation, in the JSP specification, lifecycle methods always are incorporated in the compiled object produced by the JSP compiler.

It has been recognized by many skilled artisans that custom tags represent a great advance in maintainability for server pages which need to contain both logic as well as markup. Nevertheless, server pages impose a runtime performance cost which may not justify the use of server page technology. Specifically, oftentimes a single custom tag can perform a very small bit of logic, such as fetching a message from a resource bundle or computing a resource address to place in the resulting page. In this case, the processing overhead for the custom tag lifecycle sometimes can be greater than the processing time required for the logic reference by the tag.

SUMMARY OF THE INVENTION

The present invention addresses the deficiencies of the art in respect to the invocation of a server page and provides a novel and non-obvious method, system and apparatus for modifying a server page to reduce the cost of incorporating a custom tag in the server page. Specifically, the method can include the step of modifying program code translated from a server page to replace at least one method defined in the program code and corresponding to a custom tag with an optimized method defined for the custom tag. The modifying step further can include the step of modifying the program code prior to compiling the program code into a directly callable program object. Alternatively, the modifying step further can include the step of modifying the program code by modifying byte code produced by compiling the program code.

In a preferred aspect of the invention, the modifying step can include identifying the method as a method which can be optimized. Subsequently, a replacement method template can be retrieved and the method can be replaced with method code defined in the replacement method template. The method code can be configured to call a statically defined (and hence already created instance) of a method so that no instance of the method need be created by the replaced code.

A system for reducing the run-time cost of invoking a server page can include a server page translation unit configured to translate a server page document into program code. The system further can include a custom tag handler disposed in the translation unit and coupled to a custom tag template. The custom tag handler can replace in the program code a custom tag disposed within the server page document with at least one corresponding method definition. The system yet further can include a program code compiler configured to compile the program code into a program object.

Finally, the system can include a pattern matching processor programmed to replace the method definition with an optimized replacement definition in the program code. In a preferred aspect of the invention, an optimization processor can be programmed to modify the program code to permit direct invocation of the program object by external program objects. Moreover, the server page can be a JSP. Similarly, the program code can be Java source code and the program object can be a Java class. Finally, the external program objects can be servlets.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE PREFERRED EMBODIMENTS

The present invention is a method, system and apparatus for reducing the run-time cost of incorporating custom tags in a server page. In accordance with the present invention, a server page produced to dynamically generate a viewable page can be translated into program code configured for compilation into an executable (or interpretable object). The program code can be parsed to identify the operable portion of the server page and further to identify functionality generated from a custom tag. If the identified custom tag can be optimized, the generated functionality can be replaced with optimized functionality stripped of server page management overhead instructions. Subsequently, the program code can be compiled into a program object which can be directly called by external application logic, such as a servlet.

Figure 1:
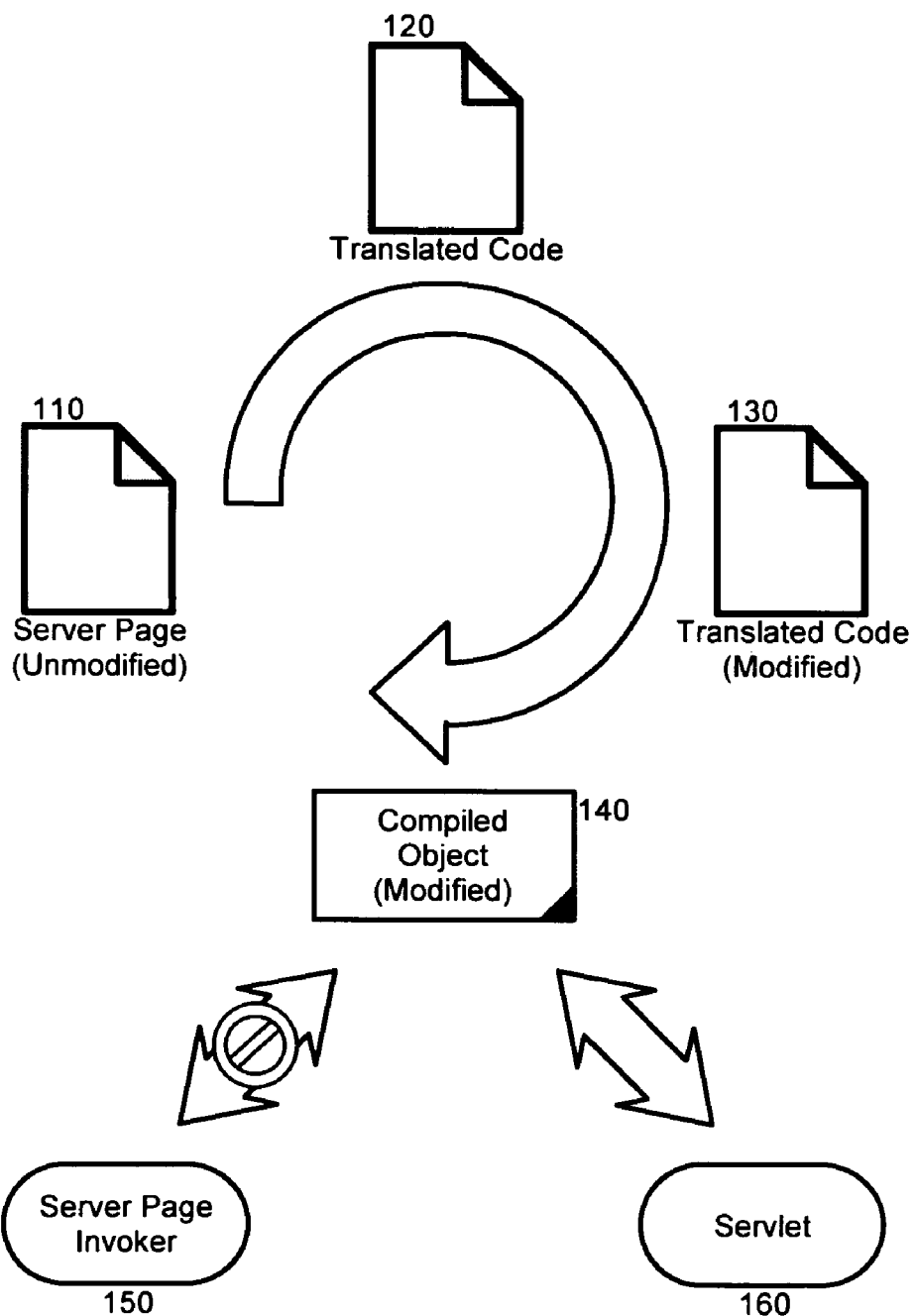
FIG. 1 is a schematic illustration of a system for reducing the run-time cost of incorporating a custom tag in a server page.

In more particular explanation, FIG. 1 is a pictorial illustration of a system for reducing the run-time cost of incorporating custom tags in a server page. In the present invention, an unmodified server page 110 can be translated to program code 120 able to be compiled into a program object for use by a server page engine as is well-known in the art. The process of compiling a server page can include both a translation step during which step the server page can be translated into program code, and also a compilation step during which step the program code can be compiled into an executable object such as a callable class. Notably, in the present invention, before the translated program code 120 can be compiled into an executable object, the translated program code 120 first can be transformed into modified translated code 130.

The modified translated code 130 can include modifications sufficient to permit the direct callability of program logic disposed within the translated program code 120. For example, the modified translated code 130 can include modified method prototypes configured to accept variable input in the form of parameters which otherwise would be provided through the server page mechanism. Consequently, once the modified translated code 130 has been compiled into a compiled object 140, the logic of the compiled object 140 can be called directly by external program logic such as a servlet 150 without requiring the use of a server page invoker 150 as an intermediary.

Importantly, during the program code modification process, the translated program code 120 can be searched for method definitions for custom tags which can be optimized in accordance with the present invention. Once located, the method definitions for the custom tags can be replaced with optimized method definitions for the custom tags. In particular, the method calling prototypes can be modified to reflect a static method call which can be directly accessed by external program logic. Moreover, the method calling prototypes can be modified to accept parameter input associated with input provided in a server page request, and to return parameter output associated with output provided in a server page response for the custom tag.

Figure 2:
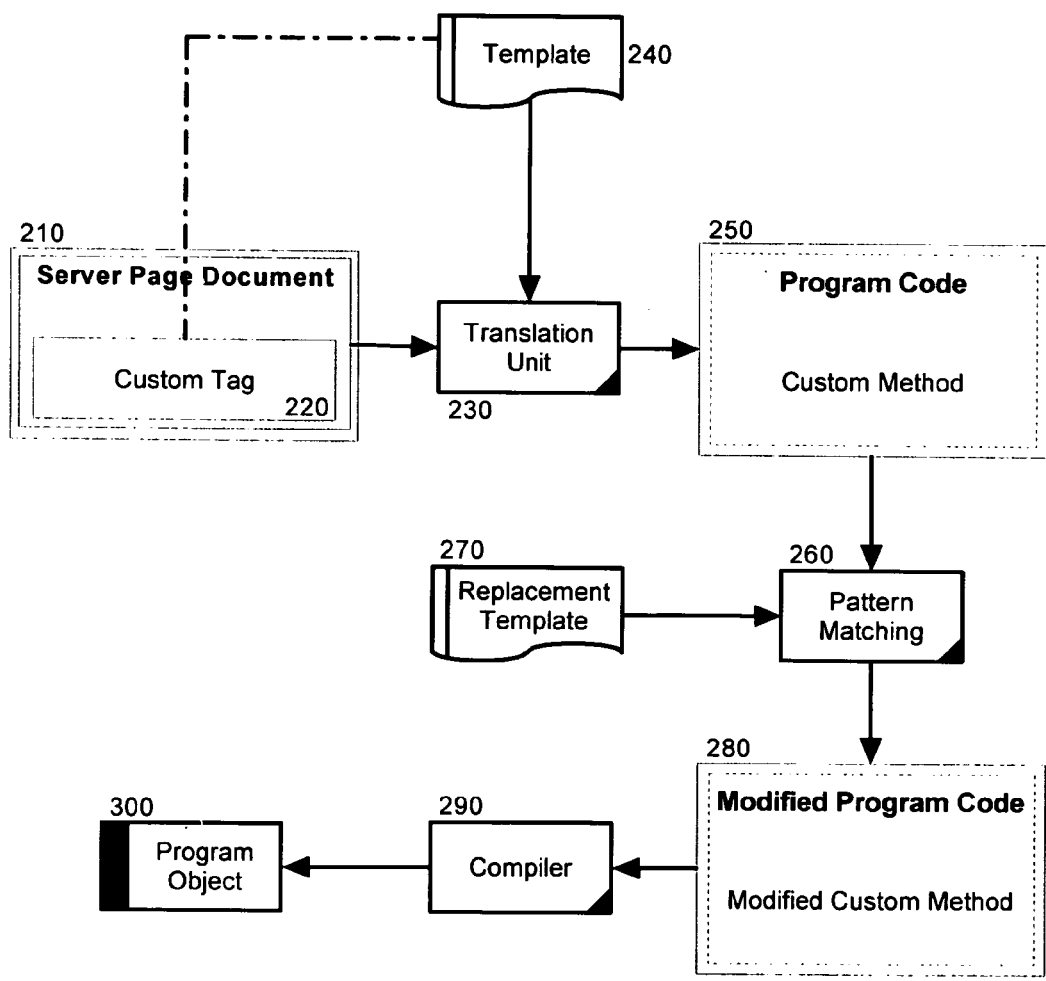
FIG. 2 is a pictorial illustration of a system and method for reducing the cost of incorporating a custom tag in the server page of the system of FIG. 1; and, FIG. 3 is a flow chart illustrating a process for reducing the run-time cost of incorporating a custom tag in the server page of the system of claim 1.

In further illustration, FIG. 2 is a block diagram depicting a system and method for reducing the cost of incorporating and processing custom tags in a server page. As shown in the block diagram of FIG. 2, a server page document 210 can custom tags 220. The custom tags 220 can refer to externally defined logic instructions as is known in the art. To that end, the server page document 210 can be a JSP or ASP conforming document configured for use in a Web distributed application. In any case, a translation unit 230 can process the server page document 210 to produce program code 250.

In this regard, the translation unit 230 can process the server page document 210 to produce program code 250 able to be compiled into a program object 300. Importantly, the translation unit 230 further can identify the custom tags 220 of the server page document 210 and can add to the program code 250 a method definition according to a template 240 specified for the custom tags 220. In a preferred aspect of the invention, the program code 250 can include a class comprised both of a constructor and companion methods for performing logical operations specified within the server page document 210 and by the custom tags 220. The program method can derive from a server page related super-class in as much as the server page engine can maintain responsibility for processing the server page specific code under normal circumstances.

Importantly, prior to compiling the program code 250 to produce the program object 300, the program code 250 can be modified to produce modified program code 280. The modified program code 280 can include a "stripped" rendition of the program code 250. More particularly, the super-class specified for the class of the program code 250 can be changed to reflect a directly callable class. Moreover, the imports required by a directly callable form of the class can be specified within the modified program code 280. Finally, the call signature for each of the constructor and methods for the class can be changed in the modified program code 280 to permit direct callability by external program logic.

As part of the modification process, a pattern matching process 260 can modify the program code 250 by locating the method definitions for the custom tags 230 which previously had been provided by the template 240. Once located, the method definitions can be matched to determine if the method definitions relate to a custom tag which can be optimized. If so, a replacement template 270 can be consulted for replacing the method definitions with replacement definitions specified in the replacement template 270. Preferably, the replacement template can place the method definition for a custom tag in a static method call having a prototype configured to accept both a request string and a response string. The request string can specify variable input for the method definition, and the response string can specify variable output produced by the method definition.

Once the modified program code 280 has been produced, a compiler 290 can compile the modified program code 280 to produce a program object 300. The compiled program object 300, however, need not conform to the prototypical object callable only through the action of a server page invoker. Rather, the modified program code 280 when compiled into the program object 300 can include a directly callable interface which can facilitate the direct invocation of the constructor and methods of the modified program code 280 by external logic, including servlets. In this way, the computing resources ordinarily consumed in processing a server page can be conserved through the direct calling of the constructor and methods without also requiring the use of the server page invoker.

Figure 3:
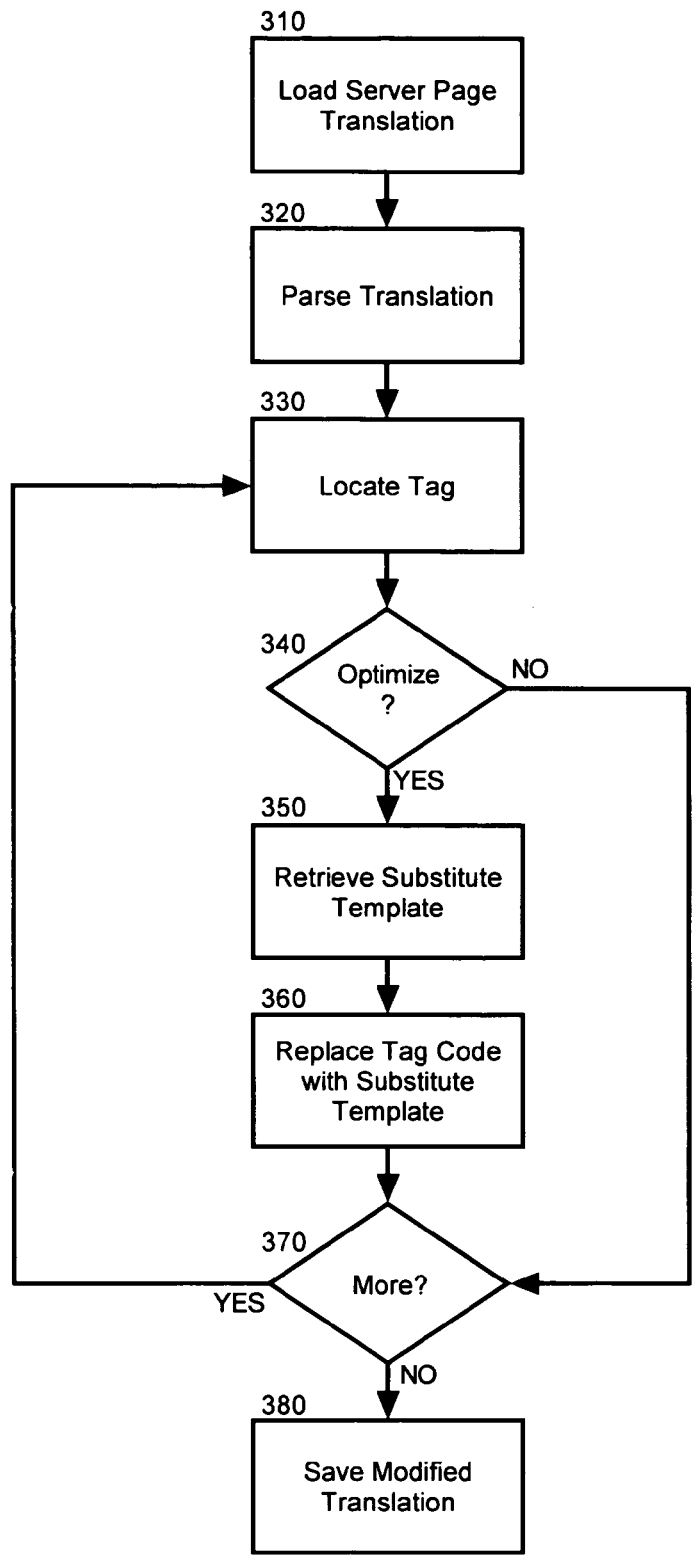

FIG. 3 is a flow chart more particularly illustrating a method for reducing the run-time cost of incorporating custom tags in a server page. Beginning in block 310, a server page translation can be loaded for analysis and in block 320 the server page translation can be parsed for analysis. A method definition corresponding to a custom tag can be located with the server page translation in block 330. Consequently, in decision block 340 it can be determined whether or not the method definition corresponding to the custom tag can be optimized.

If the method definition corresponding to the custom tag can be optimized, in block 350 a substitute template for the method definition can be retrieved and in block 360 the located method definition corresponding to the custom tag can be replaced with the method definition of the template. Subsequently, in decision block 370 if additional custom tags remain to be processed in the server page translation, the next method definition corresponding to the next custom tag can be located in block 330 and the process can continue through blocks 340 through 370. Otherwise, in block 380 the modified translation can be saved for compilation.

Importantly, it is to be understood by the skilled artisan that the foregoing methodology does not relate to the exclusive means for performing the inventive method for reducing the run-time cost of incorporating a custom tag in a server page. Rather, other alternative embodiments are contemplated as within the scope of the present invention. As an example, in an alternative embodiment of the present invention, the replacement of the method definitions for the custom tags can occur through byte code replacement subsequent to compilation.

The present invention can be realized in hardware, software, or a combination of hardware and software. An implementation of the method and system of the present invention can be realized in a centralized fashion in one computer system, or in a distributed fashion where different elements are spread across several interconnected computer systems. Any kind of computer system, or other apparatus adapted for carrying out the methods described herein, is suited to perform the functions described herein.

A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which, when loaded in a computer system is able to carry out these methods.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

We claim:

1. A method for reducing the run-time cost of incorporating a custom tag in a server page, the method comprising the step of modifying program code translated from a server page to replace at least one method defined in said program code and corresponding to a custom tag with an optimized method defined for said custom tag.

2. The method of claim 1, wherein said modifying step further comprises the step of modifying said program code prior to compiling said program code into a directly callable program object.

3. The method of claim 1, wherein said modifying step further comprises the step of modifying said program code by modifying byte code produced by compiling said program code.

4. The method of claim 1, wherein said modifying step comprises the steps of:
identifying said at least one method as a method which can be optimized;
retrieving a replacement method template; and,
replacing said at least one method with method code defined in said replacement method template.

5. The method of claim 4, wherein said replacing step comprises the step of configuring said method code to call a statically defined method so that no instance of said method need be created by said method code.

6. A system for reducing the run-time cost of invoking a server page comprising:
a server page translation unit configured to translate a server page document into program code;
a custom tag handler disposed in said translation unit and coupled to a custom tag template, said custom tag handler replacing in said program code a custom tag disposed within said server page document with at least one corresponding method definition;

a program code compiler configured to compile said program code into a program object; and, a pattern matching processor programmed to replace said method definition with an optimized replacement definition in said program code.

7. The system of claim 6, further comprising an optimization processor programmed to modify said program code to permit direct invocation of said program object by external program objects.

8. The system of claim 6, wherein the server page is a Java server page (JSP).

9. The system of claim 6, wherein said program code is Java source code and wherein said program object is a Java class.

10. The system of claim 7, wherein said external program objects are servlets.

11. A machine readable storage having stored thereon a computer program for reducing the run-time cost of incorporating a custom tag in a server page, the computer program comprising a routine set of instructions which when executed by a machine cause the machine to perform the step of modifying program code translated from a server page to replace at least one method defined in said program code and corresponding to a custom tag with an optimized method defined for said custom tag.

12. The machine readable storage of claim 11, wherein said modifying step further comprises the step of modifying said program code prior to compiling said program code into a directly callable program object.

13. The machine readable storage of claim 11, wherein said modifying step further comprises the step of modifying said program code by modifying byte code produced by compiling said program code.

14. The machine readable storage of claim 11, wherein said modifying step comprises the steps of:

identifying said at least one method as a method which can be optimized;

retrieving a replacement method template; and, replacing said at least one method with method code defined in said replacement method template.

15. The machine readable storage of claim 14, wherein said replacing step comprises the step of configuring said method code to call a statically defined method so that no instance of said method need be created by said method code.

* * * * *